(12) United States Patent
Fujimoto et al.

(10) Patent No.: US 10,456,950 B2
(45) Date of Patent: Oct. 29, 2019

(54) METHOD OF FORMING TOPPING SHEET AND APPARATUS THEREOF

(71) Applicant: TOYO TIRE & RUBBER CO., LTD., Osaka-shi, Osaka (JP)

(72) Inventors: Masaya Fujimoto, Osaka (JP); Kazuhiro Kobayashi, Osaka (JP)

(73) Assignee: TOYO TIRE CORPORATION, Itami-shi, Hyogo (JP)

( * ) Notice: Subject to any disclaimer, the term of this patent is extended or adjusted under 35 U.S.C. 154(b) by 0 days.

(21) Appl. No.: 15/491,416

(22) Filed: Apr. 19, 2017

(65) Prior Publication Data

US 2017/0312942 A1    Nov. 2, 2017

(30) Foreign Application Priority Data

Apr. 27, 2016 (JP) .................................. 2016-089782

(51) Int. Cl.
| | |
|---|---|
| *B32B 41/00* | (2006.01) |
| *B29B 15/12* | (2006.01) |
| *B29D 30/38* | (2006.01) |
| *B29D 30/46* | (2006.01) |
| *B29C 43/28* | (2006.01) |
| *B26D 1/18* | (2006.01) |

(Continued)

(52) U.S. Cl.
CPC ............. *B29B 15/122* (2013.01); *B26D 1/18* (2013.01); *B26D 1/547* (2013.01); *B29C 43/28* (2013.01); *B29D 30/38* (2013.01); *B29D 30/46* (2013.01); *B26D 2001/008* (2013.01); *B29C 43/24* (2013.01); *B29D 2030/386* (2013.01); *B29D 2030/466* (2013.01); *B29K 2105/24* (2013.01); *B29K 2105/246* (2013.01); *B29L 2030/00* (2013.01)

(58) Field of Classification Search
CPC ........................ B29K 2105/246; B29B 15/122
USPC ............................ 156/64, 350, 351, 378, 379
See application file for complete search history.

(56) References Cited

U.S. PATENT DOCUMENTS

| 1,452,379 A | 4/1923 | Haren et al. |
|---|---|---|
| 5,989,374 A | 11/1999 | Bull et al. |

(Continued)

FOREIGN PATENT DOCUMENTS

| CN | 1160631 A | 10/1997 |
|---|---|---|
| CN | 1411979 A | 4/2003 |

(Continued)

OTHER PUBLICATIONS

Extended European Search Report dated Sep. 4, 2017, issued in corresponding Application No. 17167144.9.

(Continued)

*Primary Examiner* — Michael N Orlando
*Assistant Examiner* — Joshel Rivera
(74) *Attorney, Agent, or Firm* — Westerman, Hattori, Daniels & Adrian, LLP

(57) ABSTRACT

A topping sheet forming method includes: a feeding and division step of feeding a textile original fabric, obtained by weaving longitudinally aligned tire cords into a cord fabric by use of weft yarns, and cutting off the weft yarns in predetermined widthwise positions to divide the textile original fabric into a plurality of narrow textile original fabrics; and a topping step of topping at least one surface of each of the narrow textile original fabrics with unvulcanized rubber.

9 Claims, 7 Drawing Sheets

(51) Int. Cl.
  *B26D 1/547*  (2006.01)
  *B29K 105/24*  (2006.01)
  *B29C 43/24*  (2006.01)
  *B26D 1/00*  (2006.01)
  *B29L 30/00*  (2006.01)

(56) References Cited

U.S. PATENT DOCUMENTS

| | | | |
|---|---|---|---|
| 6,148,871 | A | 11/2000 | Hassell et al. |
| 9,944,034 | B2 | 4/2018 | Fujimoto et al. |
| 10,065,341 | B2 | 9/2018 | Fujimoto et al. |
| 2003/0070742 | A1 | 4/2003 | Risser et al. |
| 2005/0048857 | A1 | 3/2005 | Terschueren et al. |
| 2009/0249597 | A1 | 10/2009 | Tatara et al. |
| 2009/0249598 | A1* | 10/2009 | Tatara .................... B29C 43/24 28/212 |
| 2016/0001502 | A1 | 1/2016 | Urabe |

FOREIGN PATENT DOCUMENTS

| | | |
|---|---|---|
| CN | 1765614 A | 5/2006 |
| CN | 104995006 A | 10/2015 |
| DE | 2314889 A1 | 10/1974 |
| DE | 2433288 A1 | 2/1975 |
| EP | 1226925 A1 | 7/2002 |
| JP | H07070869 A | 3/1995 |
| JP | 2011073439 A | 4/2011 |
| JP | 2012-161969 A | 8/2012 |
| WO | 2007/007405 A1 | 1/2007 |

OTHER PUBLICATIONS

Extended European Search Report dated Sep. 1, 2017, issued in Application No. 17167137.3 (corresponding to U.S. Appl. No. 15/491,360).
Office Action dated Nov. 5, 2018, issued in Chinese Application No. 201710237192.1 (which is counterpart to U.S. Appl. No. 15/491,362); with English translation. (10 pages).
Office Action dated Nov. 5, 2018, issued in Chinese Application No. 201710234865.8 (which is counterpart to U.S. Appl. No. 15/491,360); with English translation. (10 pages).
Office Action dated Jan. 3, 2019, issued in counterpart CN Application No. 201710235022.X, with English translation (11 pages).
Office Action dated Jan. 3, 2019, issued in CN Application 201710242096.6, with English translation corresponds to U.S. Appl. No. 15/491,358 (11 pages).
Non-Final Office Action dated Mar. 28, 2019, issued in U.S. Appl. No. 15/491,362. (26 pages).

* cited by examiner

METHOD OF FORMING TOPPING SHEET AND APPARATUS THEREOF

CROSS-REFERENCE TO RELATED APPLICATION

This application claims priority of Japanese Patent Application No.: 2016-089782 filed on Apr. 27, 2016, the content of which is incorporated herein by reference.

BACKGROUND OF THE INVENTION

Technical Field

The present invention relates to a method of forming a topping sheet and an apparatus thereof.

Related Art

For forming carcass ply that makes a skeleton of a pneumatic tire, first, a textile original fabric, obtained by weaving longitudinally aligned tire cords into a cord fabric by use of weft yarns, is prepared and then topped with unvulcanized rubber to form a topping sheet. Subsequently, the topping sheet is cut off into a length corresponding to a width of the carcass ply to form strip-shaped ply pieces. Further, non-cut ends of the ply pieces are sequentially connected to form a long ply original fabric. Then, the ply original fabric is wound around a molding drum to be expanded outer-diametrically and molded by vulcanization in a tire vulcanizing mold, thereby forming carcass ply.

Each carcass ply has a different width depending on the size and specification of the pneumatic tire, and the ply original fabric is formed for each carcass ply. For this reason, the ply original fabric is once stored in a wound state as an intermediate molded article (intermediate work-in-process) and is then released and supplied at the time of molding the corresponding pneumatic tire. This results in complex production control on the ply original fabric. In order to facilitate the production control on the ply original fabric, it has been proposed that the ply original fabric be directly supplied to a molding step without being stored as the intermediate molded article (e.g., WO2007/007405A1).

The direct supply of the ply original fabric to the molding step requires a compact configuration of an apparatus for forming the ply original fabric because of constraint on equipment arrangement space. For this reason, the topping sheet has been configured to have a width as narrow as about 0.5 m, for example.

However, the topping sheet is typically formed of a wide textile original fabric having a width of about 1.4 m to 1.5 m. That is, a narrow topping sheet has been formed by first topping a wide textile original fabric with the unvulcanized rubber to form a wide topping sheet, and then dividing this sheet widthwise. Another method has also been proposed where tire cords are supplied from a large number of cord bobbins to form a narrow cord original fabric, and this is topped with the unvulcanized rubber to form a narrow topping sheet (e.g., JP 2012-161969 A).

SUMMARY

However, in the former method, since the wide topping sheet is topped with the unvulcanized rubber, dividing this sheet widthwise is not easy. Further, a calender line that makes topping with the unvulcanized rubber increases in size widthwise in accordance with the wide textile original fabric. Meanwhile, in the latter method, a calender unit can be reduced in size, but it takes labor to set the large number of cord bobbins. In short, it has not been possible to efficiently form the narrow topping sheet.

Accordingly, an object of the present invention is to efficiently form a narrow topping sheet.

As means to solve the above problem, the present invention provides a topping sheet forming method that includes: a feeding and division step of feeding a textile original fabric, obtained by weaving longitudinally aligned tire cords into a cord fabric by use of weft yarns, and cutting off the weft yarns in predetermined widthwise positions to divide the textile original fabric into a plurality of narrow textile original fabrics; and a topping step of topping at least one surface of each of the narrow textile original fabrics with unvulcanized rubber.

According to the above, the textile original fabric can be fed and divided simultaneously, thus eliminating the need for the cord original fabric preparing step of previously preparing the narrow textile original fabric, and enabling the narrow textile original fabric to be directly supplied from the textile original fabric and topped with the unvulcanized rubber. Thereby, equipment for the cord original fabric preparing step becomes unnecessary, and it is thus possible to achieve the space saving, and efficiently form the narrow topping sheet, while reducing production cost.

The textile original fabric can be fed and cut off on each line at a time from a widthwise end of the original fabric roll.

In the feeding and division step, the textile original fabric is preferably fed from a cylindrically wound original fabric roll, and the textile original fabric is preferably divided by a wire wound on the original fabric roll in a predetermined winding angle range.

According to the above, it is possible to reliably cut off only the weft yarns without damaging warp yarns.

A winding angle of the wire is preferably changed in accordance with an outer diameter dimension of the original fabric roll.

According to the above, the wire with constantly fixed tensile force can be acted on the weft yarns, and a stable cut-off state can thus be held.

Both ends of the wire may be lifted or lowered to change the winding angle.

The textile original fabric may be cut off based on tensile force that is generated by a weight attached to one end of the wire.

According to the above, the tensile force of the wire can be adjusted automatically although the method used is simple.

The positions for cutting off the weft yarns by the wire are preferably within a feeding position.

According to the above, the weft yarns protrude from the remaining textile original fabric which is left due to the cut-off by the wire, thus enabling prevention of the tire cords on the remaining textile original fabric side from being located below the textile original fabric having been fed.

The textile original fabric may be fed by detecting widthwise displacement of the textile original fabric being fed, and moving the textile original fabric widthwise so as to eliminate the detected displacement.

According to the above, it is possible to feed the textile original fabric while preventing widthwise displacement, and appropriately carry out the subsequent topping step, and the like.

As means to solve the above problem, the present invention further provides a topping sheet forming apparatus that includes: a feeding and division part that feeds a textile original fabric, obtained by weaving longitudinally aligned tire cords into a cord fabric by use of weft yarns, and cuts off the weft yarns in predetermined widthwise positions to divide the textile original fabric into a plurality of narrow textile original fabrics; and a calender part that tops at least one surface of each of the narrow textile original fabrics, fed by the feeding and division part, with unvulcanized rubber to form a narrow topping sheet.

According to the present invention, since the narrow textile original fabric can be supplied directly from the textile original fabric and topped with the unvulcanized rubber, the need for the cord original fabric preparing step can be eliminated to achieve space saving, and efficiently form the narrow topping sheet, while reducing production cost.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Hereinafter, an embodiment according to the present invention is described in accordance with the attached drawings. Note that the following description is merely illustrative in nature and is not intended to limit the present invention, the application thereof, or the uses thereof. The drawings are made schematically, with dimensional ratios and the like different from actual ones.

A carcass ply forming step according to one embodiment of the present invention is carried out by a calender step, a ply original fabric forming step, and a molding step. In the calender step, at least one surface of a narrow textile original fabrics, obtained by dividing a textile original fabric 100, is topped with unvulcanized rubber to create a topping sheet. In the ply original fabric forming step, the topping sheet is cut off into a length corresponding to a width of the carcass ply to form strip-shaped ply pieces. Further, non-cut ends of these ply pieces are sequentially connected to form a long ply original fabric. In the molding step, the ply original fabric is wound around a molding drum to be expanded outer-diametrically and molded by vulcanization in a tire vulcanizing mold, thereby forming carcass ply.

The present invention is characterized in that in the calender step, the narrow topping sheet is formed directly from the wide textile original fabric. Hereinafter, the calender step will be described in detail, the ply original fabric forming step will be described briefly, and a description of the molding step will be omitted.

(Calender Step)

Figure 1:
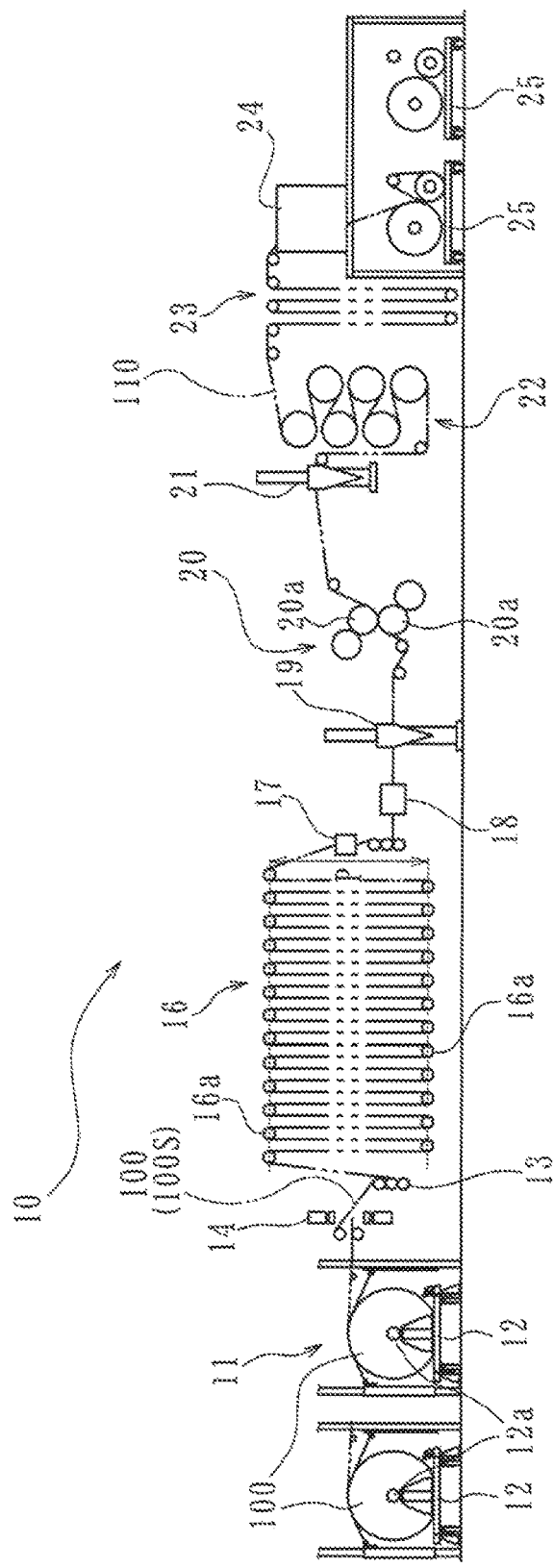
FIG. 1 is a view showing a schematic configuration of a calender line.

FIG. 1 shows a schematic configuration of a calender line 10 for carrying out the calender step.

In the calender line 10, a feeding and division part 11, a calender unit 20 (calender part), and a topping sheet wind-up unit 24 are provided in this order from the upstream (the left side in the figure) in the carrying direction. The feeding and division part 11 feeds the textile original fabric 100 downstream (to the right side in the figure) and also divides the textile original fabric 100. The calender unit 20 (calender part) tops at least one surface of the divided textile original fabric 100 with unvulcanized rubber. The topping sheet wind-up unit 24 cylindrically winds up the textile original fabric 100 topped with the unvulcanized rubber to the wind-up cart 25.

Figure 4:
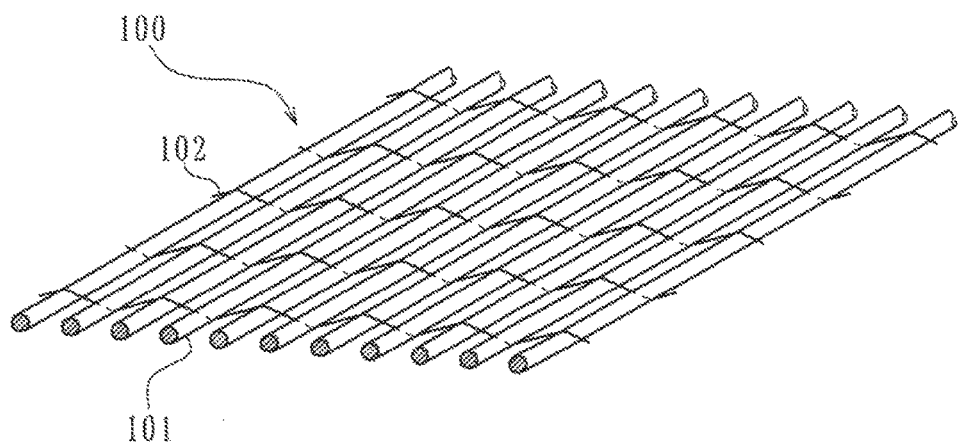
FIG. 4 is a perspective view schematically showing a textile original fabric.

In the feeding and division part 11, two carts 12, 12 are provided in parallel in the feeding direction of the textile original fabric 100. On a rolls 12a, 12a of the carts 12, 12, the textile original fabric 100 is held in the cylindrically wound state (hereinafter, the cylindrically wound textile original fabric 100 is referred to as an original fabric roll 100R). As shown in FIG. 4, the textile original fabric 100 is configured as a cord fabric woven by using as warps a plurality of longitudinally aligned tire cords 101 and providing weft yarns 102 as wefts at each required longitudinal interval. Returning to FIG. 1, the feeding unit 13 is disposed downstream from each of the carts 12, 12. The feeding unit 13 feeds the textile original fabric of either one of the carts 12, 12.

Figure 2:
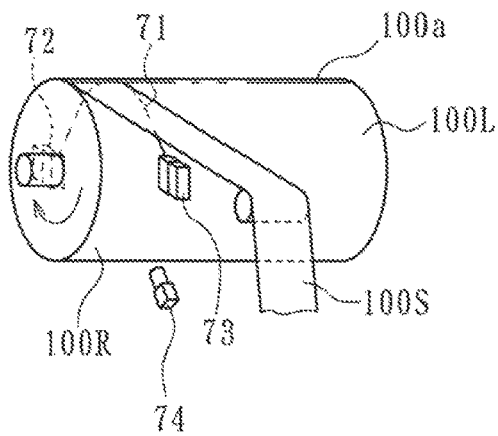
FIG. 2 is a perspective view schematically showing a feeding and division part of FIG. 1.
Figure 3:
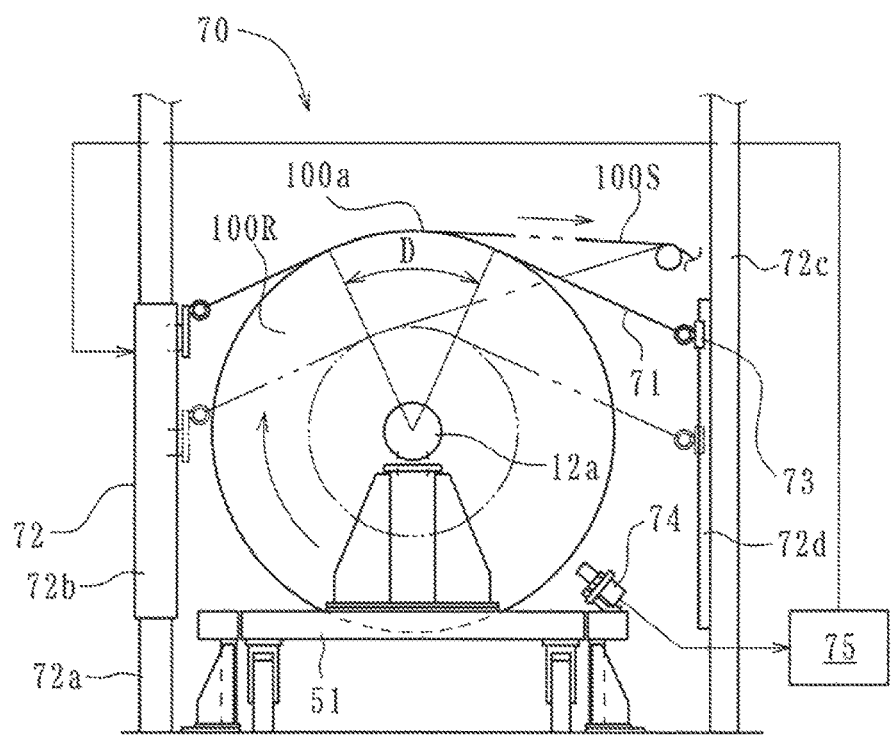
FIG. 3 is a main-part side view of FIG. 2.

As shown in FIG. 2 and specifically shown in FIG. 3, a lifting unit 72 is provided on one end side of each of the carts 12, 12 (the opposite side from the feeding direction). In the lifting unit 72, a moving body 72b is liftably provided with respect to a first support 72a, and this moving body 72b is made liftably operable by drive means, not shown. A second support 72c is provided on the other end side (the feeding-direction side) of each of the carts 12, 12. The second support 72c is provided with a rail 72d, to which a weight 73 is liftably fitted. The moving body 72b and the weight 73 are coupled through the wire 71. The wire 71 is wound on the original fabric roll 100R in a predetermined winding angle range D. The wire 71 is disposed in parallel with the tire cord 101 of the original fabric roll 100R, and is located between adjacent tire cords 101.

Each of the carts 12, 12 is provided with an outer diameter detecting unit 74 that detects an outer diameter of the original fabric roll 100R, and its detection signal is inputted into a control unit 75 (cf. FIG. 3). The control unit 75 drives and controls the lifting unit 72 based on the inputted detection signal. That is, the control unit 75 drives and controls the lifting unit 72 so as to hold the predetermined winding angle range D for the wire 71 based on the outer diameter of the original fabric roll 100R, which has been detected by the outer diameter detecting unit 74.

Specifically, as shown by chain double-dashed lines in FIG. 3, when the outer diameter of the original fabric roll 100R is reduced in association with feeding of the textile original fabric 100, the moving body 72b of the lifting unit 72 is lowered to hold a predetermined winding angle D of the wire 71. Moreover, a state is held where fixed tensile force is applied to the wire 71 by the weight 73. Accordingly, even when the outer diameter dimension of the original fabric roll 100R gradually decreases, it is possible to cause the wire 71 to flexibly follow the outer circumference of the original fabric roll 100R.

Meanwhile, the winding angle range D described above is set so as to include a feeding part 100a that feeds the wide textile original fabric 100L from the original fabric roll 100R. The predetermined winding angle range D is preferably set in a range of not smaller than 45 degrees and not larger than 60 degrees, and more preferably set in an angle range with the feeding part 100a taken as a substantially center value. The feeding part 100a here is located at the upper end of the original fabric roll 100R, and the winding angle range D for the wire 71 is set to an equivalent range on the right and left with the upper end taken as the center, in a side view of FIG. 2.

That is, the weft yarns 102 of the wide textile original fabric 100L being fed from the original fabric roll 100R are cut off by the wire 71 and divided into the narrow textile original fabrics 100S in the feeding part 100a. Even when the tire cord 101 is displaced widthwise, the wire 71 can be reliably disposed between adjacent tire cords 101, thus causing no damage on the tire cords 101. That is, the use of the wire 71 enables division of the wide textile original fabric 100L into the narrow textile original fabrics 100S without damaging the tire cord 101.

Figure 5:
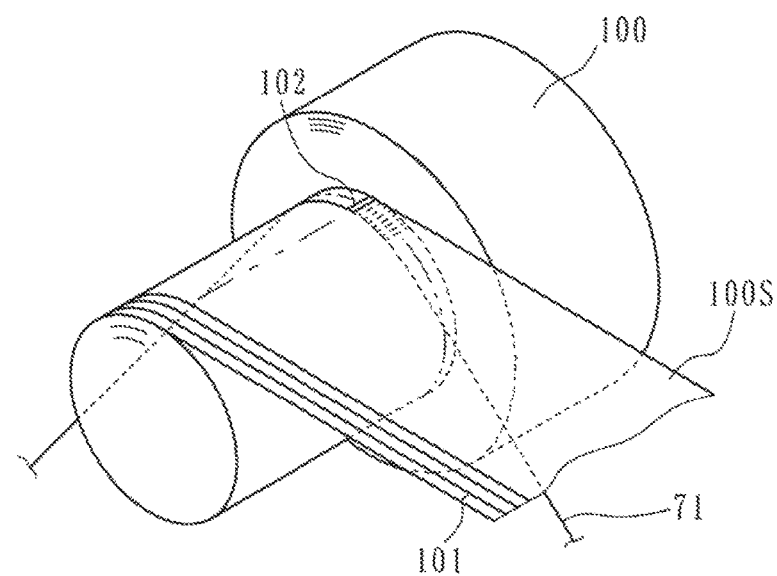
FIG. 5 is a schematic perspective view showing a state where an original fabric roll is cut off by a wire and a narrow textile original fabric is fed.

Further, as shown in FIG. 5, the position for cutting off the weft yarns 102 by the wire 71 is within the width dimension of the narrow textile original fabric 100S. This can bring the remaining portion after the cut-off of the weft yarns 102 and the feeding of the narrow textile original fabric 100S into a state where the weft yarns 102 protrude laterally to the tire cord 101. Hence it is possible to prevent the tire cord 101 from being displaced laterally and falling or attaching to a winding layer formed by winding on the inner diameter side.

In place of the outer diameter detecting unit 74, the change in outer diameter of the original fabric roll 100R may be estimated based on an amount of feeding from the original fabric roll 100R. For example, by measuring the change in weight of the original fabric roll 100R (which may include a weight of the cart 51), the amount of the wide textile original fabric 100L fed from the original fabric roll 100R may be calculated, to estimate the outer diameter of the original fabric roll 100R.

Figure 6A:
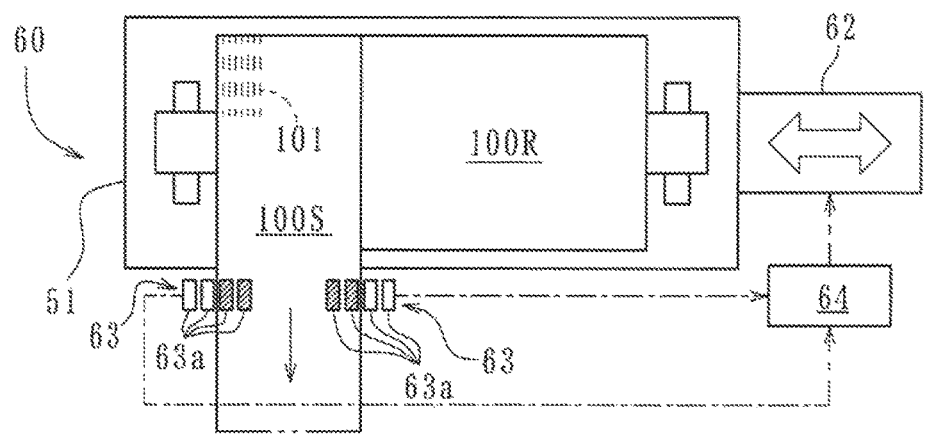
FIG. 6A is a plan view schematically showing the feeding and division part of FIG. 1.

As shown in FIG. 6A, in order to correct displacement of the narrow textile original fabric 100S, fed from the cart 12, from a regular position, the feeding and division part 11 further includes a cart moving unit 62 that moves the cart 12 widthwise, a detection device 63 that detects the widthwise position of the end of the narrow textile original fabric 100S being fed from the cart 51, and a control unit 64 that operates the cart moving unit 62 based on the detection result of the detection device 63.

The cart moving unit 62 is configured such that rotationally driving a ball screw, for example, can move the cart 12 to a desired widthwise position of the textile original fabric 100.

The detection device 63 is made up of a plurality of photoelectric tubes 63a provided in parallel widthwise in the vicinities of the ends. In the present embodiment, four photoelectric tubes 63a are provided in parallel widthwise in the vicinity of each of the widthwise ends.

The control unit 64 includes a displacement detecting part that detects a widthwise displacement amount Z (cf. FIG. 6A) of the end of the narrow textile original fabric 100S based on the detection result of the detection device 63, and a driving controlling part that drives and controls the cart moving unit 62. On the basis of the detection result of the detection device 63, namely the detection results of the plurality of photoelectric tubes 63a, the displacement detecting part detects the widthwise displacement amount Z of the end of the narrow textile original fabric 100S. The driving controlling part drives and controls the cart moving unit 62 so as to move the cart 12 widthwise along the narrow textile original fabric 100S based on the widthwise displacement amount Z of the narrow textile original fabric 100S which has been detected by the displacement detecting part, so as to eliminate the displacement.

Figure 6B:
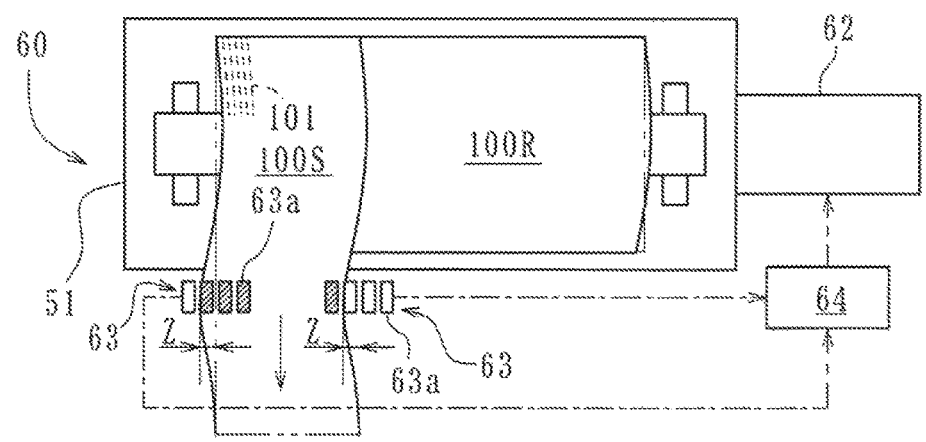
FIG. 6B is a plan view showing an example of a state where a narrow textile original fabric in the feeding and division part of FIG. 6A has been displaced.

For example, as shown in FIG. 6B, when three widthwise inner-end photoelectric tubes 63a of the photoelectric tubes 63a on the left side of the plurality of photoelectric tubes 63a detect the textile original fabric 100 and one widthwise inner-end photoelectric tube 63a of the photoelectric tubes 63a on the right side of the above photoelectric tubes 63a detects the textile original fabric 100 as shown by hatching in the figure, the displacement detecting part detects that the narrow textile original fabric 100S fed from the cart 12 is being fed to a widthwise biased position (on the left in the figure) by the displacement amount Z. In FIG. 6B, symbol Z denotes an amount of displacement with respect to the narrow textile original fabric 100S being fed to the widthwise center.

Figure 6C:
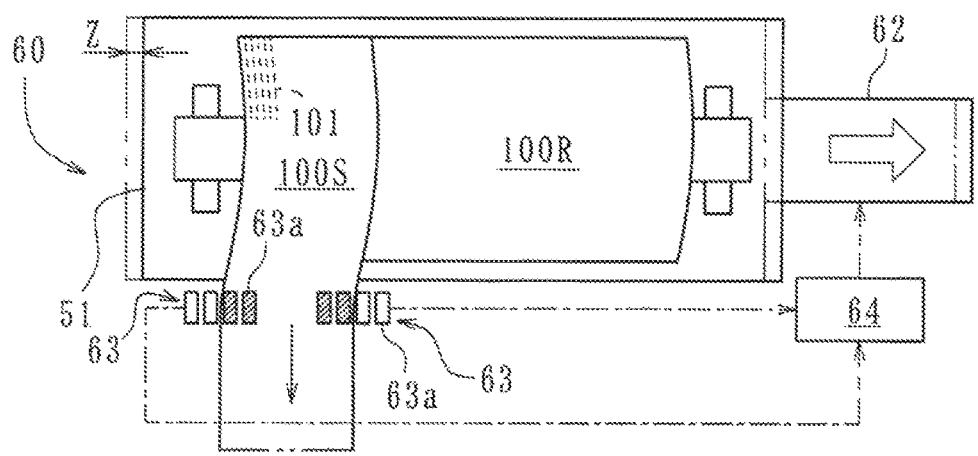
FIG. 6C is a plan view showing a state after the displacement of the narrow textile original fabric of FIG. 6B has been corrected.

In this case, a driving controlling part 642 drives and controls the cart moving unit 62 so as to eliminate the widthwise displacement of the narrow textile original fabric 100S being fed. That is, the driving controlling part drives and controls the cart moving unit 62 so as to move the cart 51 by the displacement amount Z in the direction (to the right in the figure) opposite to the displacement direction (the left in the figure), so as to eliminate the displacement of the textile original fabric 100. The cart 12 is thus moved to the right by the displacement amount Z as shown in FIG. 6C, thereby eliminating the widthwise displacement and centering the narrow textile original fabric 100S fed from the cart 12.

As thus described, the narrow textile original fabric 100S is fed while the widthwise displacement thereof is prevented, and then carried downstream in the calender line 10 while being divided widthwise. It is thus possible to appropriately top the narrow textile original fabric 100S prevented from varying widthwise.

In the feeding and division part 11 with the above configuration, the wide textile original fabric 100L can be divided widthwise at the first stage of the calender line 10. Namely, although the textile original fabric 100 is typically the wide textile original fabric 100L having a width of about 1.4 m to 1.5 m, it can be the narrow textile original fabric 100S having a width of about 0.45 m to 0.5 m. The narrow textile original fabric 100S can be divided from one end side of the wide textile original fabric 100L on each line at a time. When the narrow textile original fabric 100S on a first line is divided from the wide textile original fabric 100L, the narrow textile original fabric 100S on the subsequent line can be divided therefrom by sequentially shifting the position of the wire 71 along an axis of the roll 12a with the textile original fabric 100 wound therearound. Since the widthwise displacement of the narrow textile original fabric 100S being carried has been corrected, the surface thereof can be appropriately topped to obtain a desired topping sheet.

As shown in FIG. 1, the junction unit 14 is provided between the feeding and division part 11 and the feeding unit 13. When a terminal end of the textile original fabric 100 being fed from one cart 12 of the two carts 12, 12 comes out, the junction unit 14 joins this terminal end with a starting end of the textile original fabric 100 being fed from the other cart 12. Hence the textile original fabric 100 is successively fed regardless of switching between the feeding carts 12.

A first festoon unit 16 is provided downstream from the feeding unit 13. The first festoon unit 16 includes a plurality of vertically disposed rollers 16a, and the plurality of rollers 16a are configured with vertical pitches P1 being variable. The textile original fabric 100 is wound on the plurality of rollers 16a in a vertically alternate manner. That is, the first festoon unit 16 can make a carrier path longer by extending the pitch P1, to store a required amount of the textile original fabric 100 as a buffer. The first festoon unit 16 can make the carrier path shorter by shortening the pitch P1, to supply the textile original fabric 100 downstream from the buffer.

That is, when the feeding of the textile original fabric 100 is to be temporarily stopped in the feeding and division part 11, e.g., when the feeding cart 12 is to be switched, the first festoon unit 16 supplies downstream the textile original fabric 100 stored as the buffer. Namely, a decrease in operating rate of the calender line 10 can be prevented by keeping the calender line 10 from stopping.

A centering unit 17, a weft yarn removing unit 18, and a first dancer unit 19 are provided in this order downstream from the first festoon unit 16. The centering unit 17 adjusts a widthwise position of the textile original fabric 100 to the center. The weft yarn removing unit 18 divides the weft yarns 102 of the textile original fabric 100 and removes them from the tire cords 101. The first dancer unit 19 adjusts a path length of the narrow textile original fabric 100S with the weft yarns removed therefrom.

The calender unit 20 is provided downstream from the first dancer unit 19. The calender unit 20 allows passage of the plurality of tire cords 101 between a pair of calender rolls 20a, 20a, to top at least one surface of the tire cord 101 with the unvulcanized rubber.

A second dancer unit 21 and the cooling unit 22 are provided in this order downstream from the calender unit 20. A topping sheet 110 obtained by topping with the unvulcanized rubber in the calender unit 20 passes through the second dancer unit 21 and is then cooled by the cooling unit 22.

A second festoon unit 23 and a topping sheet wind-up unit 24 are provided in this order downstream from the cooling unit 22. Two wind-up carts 25, 25 are disposed in the topping sheet wind-up unit 24, and the topping sheet 110 carried through the second festoon unit 23 is alternately wound up to the two carts 25. Note that the second festoon unit 23 ensures the buffer at the time of switching the cart 25, to prevent stoppage of the calender line 10.

(Ply Original Fabric Forming Step)

Figure 7:
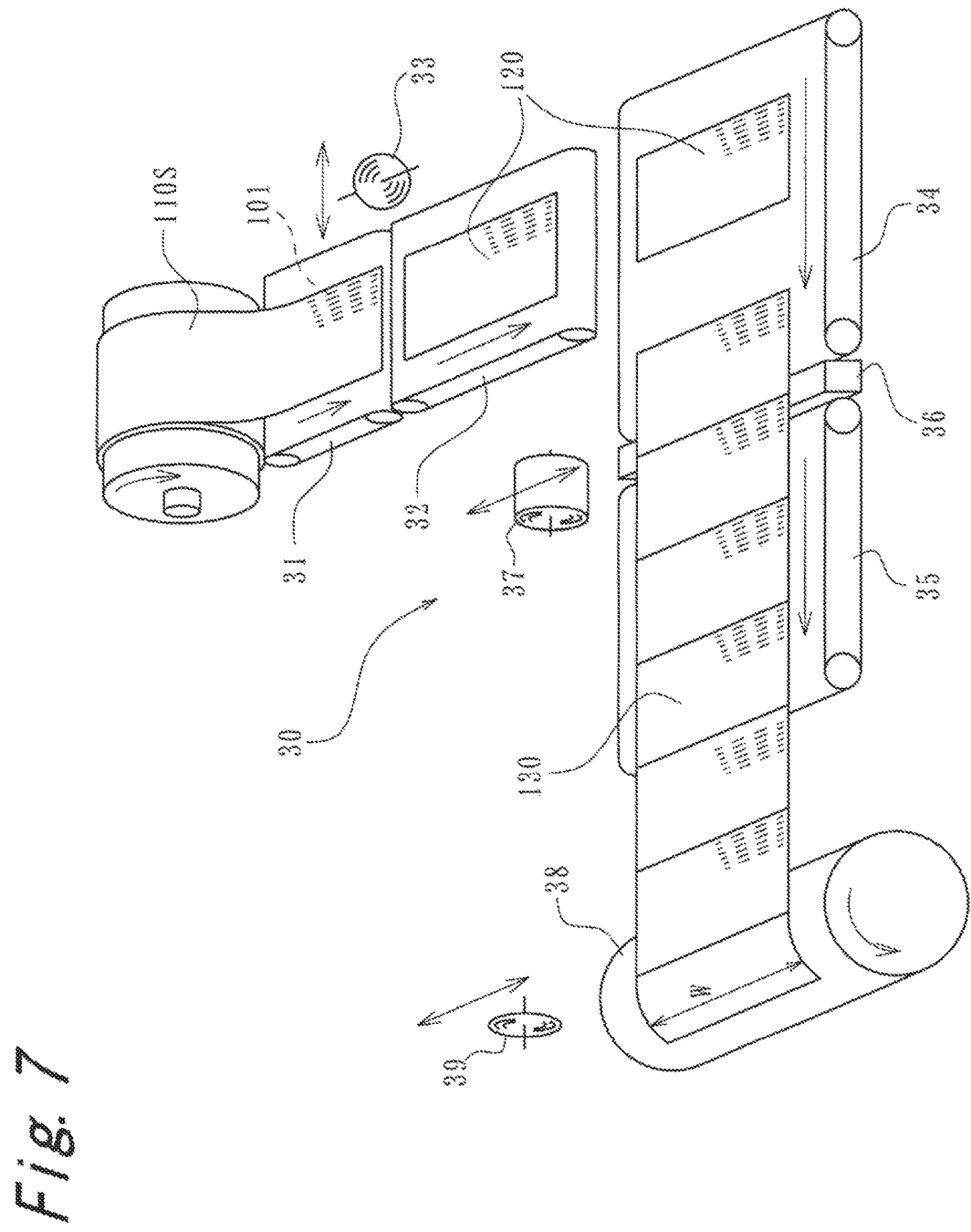
FIG. 7 is a view schematically showing a ply original fabric forming step.

FIG. 7 schematically shows a ply original fabric forming line 30 where the ply original fabric forming step is carried out.

The first half of the ply original fabric forming line 30 is provided with a first conveyor 31 and a second conveyor 32 that feed the cylindrically wound topping sheet 110 with a predetermined length, and a first cutting unit 33 that moves widthwise between these conveyors. The latter half of the ply original fabric forming line 30 is provided with a third conveyor 34, a fourth conveyor 35, a coupling stage 36 located between these conveyors, and a pressing unit 37 movable widthwise on the coupling stage 36.

That is, in the first half of the ply original fabric forming line 30, the topping sheet 110 with the predetermined length is fed by the first and second conveyors 31, 32, and then cut off by the first cutting unit 33 into strip-shaped ply pieces 120. The predetermined length is here set to a length corresponding to a width W of the carcass ply. In the present embodiment, the topping sheet 110 is cut off at an angle substantially orthogonal to the tire cord 101, but it may be cut off at an angle of about 75° to 90° with respect to the tire cord 101 so as to form carcass ply for a pneumatic radial tire.

Subsequently, the strip-shaped ply pieces 120 are transferred to the latter half of the ply original fabric forming line 30, and carried parallel to the direction of the cutting by the first cutting unit 33 (i.e., perpendicularly to the carrying direction in the first half) by the third and fourth conveyors 34, 35. At this time, the third and fourth conveyors 34, 35 operate such that a carrying-direction rear edge of the preceding ply piece 120 is butted with a carrying-direction front edge of the subsequent ply piece 120 on the coupling stage 36. The pressing unit 37 moves widthwise while the mutually facing edges of the sequentially carried ply pieces 120 are butted with each other on the coupling stage 36, to sequentially couple these ply pieces 120.

That is, the strip-shaped ply pieces 120 are cut off from the topping sheet 110, and the ply pieces 120 are sequentially coupled, to form the long ply original fabric 130. The ply original fabric 130 is directly supplied to the tire molding step without being wound up cylindrically, and is then wound on a molding drum 38. The ply original fabric 130 wound on the molding drum 38 is cut off by a second cutting unit 39 to have a length corresponding to a circumferential length of the tire.

(Other Embodiments)

Note that the present invention is not limited to the configuration described in the above embodiment, but a variety of changes can be made.

Figure 8:
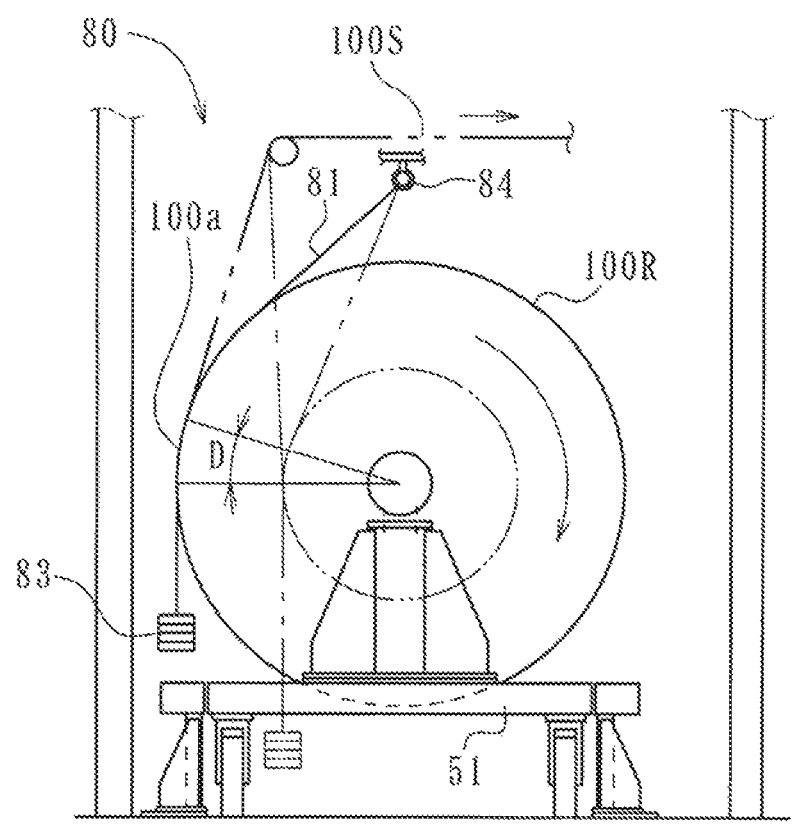
FIG. 8 is a main-part side view of a feeding and division part according to another embodiment.

FIG. 8 shows a feeding and division part 80 according to another embodiment. In this feeding and division part 80, one end of the wire 81 is fixed to a supporting point 84 above the original fabric roll 100R, and the other end thereof is coupled with a weight 83. The wire 81 extends vertically while being wound on the side of the original fabric roll 100R. This eliminates the need for the lifting unit 72, the outer diameter detecting unit 74, and the control unit 75 as in the feeding and division part 11.

The feeding part 100a of the original fabric roll 100R is set so as to be located in a substantially center position of the winding angle range D for the wire 81. This eliminates the need for the lifting unit 72, the outer diameter detecting unit 74, and the control unit 75, and the wire 81 can be wound on the side of the feed position of the original fabric roll 100R without being influenced by the change in outer diameter of the original fabric roll 100R. That is, with the simple configuration, it is possible to stably divide the wide textile original fabric 100L into the narrow textile original fabrics 100S regardless of the change in outer diameter of the original fabric roll 100R, without causing damage on the tire cord 101.

What is claimed is:

1. A topping sheet forming method comprising:
a feeding and division step of feeding a textile original fabric, obtained by weaving longitudinally aligned tire cords into a cord fabric by use of weft yarns and the textile original fabric comprises at least one surface which has not been topped with rubber, and simultaneously cutting off the weft yarns in predetermined widthwise positions to divide the textile original fabric into a plurality of narrow textile original fabrics; and
a topping step of topping at least one surface of each of the narrow textile original fabrics, which is fed by the feeding and division step, with unvulcanized rubber to form a narrow topping sheet whose width is narrower than the width of the textile original fabric, wherein in the feeding and division step, the textile original fabric is fed from a cylindrically wound original fabric roll, and the textile original fabric is divided by a wire wound on the original fabric roll in a predetermined winding angle range.

2. The topping sheet forming method according to claim 1, wherein the textile original fabric is fed and cut off on each line at a time from a widthwise end of the original fabric roll.

3. The topping sheet forming method according to claim 1, wherein a winding angle of the wire is changed in accordance with an outer diameter dimension of the original fabric roll.

4. The topping sheet forming method according to claim 3, wherein both ends of the wire are lifted or lowered to change the winding angle.

5. The topping sheet forming method according to claim 3, wherein the textile original fabric is cut off based on tensile force that is generated by a weight attached to one end of the wire.

6. The topping sheet forming method according to claim 1, wherein the positions for cutting off the weft yarns by the wire is within a feeding position.

7. The topping sheet forming method according to claim 1,
wherein the textile original fabric is fed by
detecting widthwise displacement of the textile original fabric being fed, and
moving the textile original fabric widthwise so as to eliminate the detected displacement.

8. A topping sheet forming apparatus comprising:
a feeding and division part that feeds a textile original fabric, obtained by weaving longitudinally aligned tire cords into a cord fabric by use of weft yarns, and simultaneously cuts off the weft yarns in predetermined widthwise positions to divide the textile original fabric into a plurality of narrow textile original fabrics, the feeding and division part comprising a cylindrically wound textile original fabric roll and a cutting means positioned on the textile original fabric roll; and a calender part that tops at least one surface of each of the narrow textile original fabrics, fed by the feeding and division part, with unvulcanized rubber to form a narrow topping sheet whose width is narrower than the width of the textile original fabric, wherein the cutting means includes a wire wound on the original fabric roll in a predetermined winding angle range to divide the original fabric roll.

9. Topping sheet forming method comprising:
a feeding and division step of feeding a textile original fabric, obtained by weaving longitudinally aligned tire cords into a cord fabric by use of weft yarns, and simultaneously cutting off the weft yarns in predetermined widthwise positions to divide the textile original fabric into a plurality of narrow textile original fabrics so that the textile original fabric is fed from a cylindrically wound textile original fabric roll, and the textile original fabric is cut on the textile original fabric roll; and a topping step of topping at least one surface of each of the narrow textile original fabrics, which is fed by the feeding and division step, with unvulcanized rubber to form a narrow topping sheet whose width is narrower than the width of the textile original fabric, wherein in the feeding and division step, the textile original fabric is divided by a wire wound on the original fabric roll in a predetermined winding angle range.

* * * * *